United States Patent
Abbiati et al.

(10) Patent No.: US 11,517,140 B2
(45) Date of Patent: Dec. 6, 2022

(54) STEAM DISPENSING APPARATUSES FOR HOT BEVERAGE PREPARATION

(71) Applicant: Gruppo Cimbali S.p.A., Binasco (IT)

(72) Inventors: Giacomo Abbiati, Binasco (IT); Alberto Galimberti, Binasco (IT)

(73) Assignee: GRUPPO CIMBALI S.p.A., Binasco (IT)

( * ) Notice: Subject to any disclaimer, the term of this patent is extended or adjusted under 35 U.S.C. 154(b) by 565 days.

(21) Appl. No.: 16/599,566

(22) Filed: Oct. 11, 2019

(65) Prior Publication Data
US 2020/0113371 A1 Apr. 16, 2020

(30) Foreign Application Priority Data

Oct. 12, 2018 (IT) .......................... 102018000009404

(51) Int. Cl.
| | | |
|---|---|---|
| A47J 31/44 | (2006.01) | |
| A47J 31/46 | (2006.01) | |
| A47J 31/52 | (2006.01) | |

(52) U.S. Cl.
CPC ......... *A47J 31/4489* (2013.01); *A47J 31/461* (2018.08); *A47J 31/52* (2013.01)

(58) Field of Classification Search
CPC .... A47J 31/4485; A47J 31/4489; A47J 31/60; A47J 31/44; A47J 31/461; A47J 31/52
USPC ......... 99/279, 280, 281, 282, 293, 295, 300, 99/337; 426/115, 231, 433, 580, 586, 426/593, 594, 597; 261/26, 30, 33, 76, 261/142
See application file for complete search history.

(56) References Cited

U.S. PATENT DOCUMENTS

2016/0296063 A1* 10/2016 Ferraro ................... A47J 31/60

FOREIGN PATENT DOCUMENTS

| WO | 2011/048078 A2 | 4/2011 |
|---|---|---|
| WO | 2016/203363 A1 | 12/2016 |

OTHER PUBLICATIONS

Italian Search Report and Written Opinion dated Jun. 3, 2019, in IT Application No. 102018000009404, 8 pages.

* cited by examiner

*Primary Examiner* — Phuong T Nguyen
(74) *Attorney, Agent, or Firm* — MH2 Technology Law Group LLP

(57) ABSTRACT

A steam dispensing apparatus for hot beverage preparation may include: a boiler configured to generate steam and comprising a first outlet; a wand configured to introduce the steam into a container; a steam supply conduit connected to the first outlet of the boiler and configured to supply the steam to the wand; and a valve for dispensing the steam to the wand and for draining condensation water formed in the steam supply conduit upstream from the valve, during a closing time of the valve elapsed from a previous dispensing operation, wherein the valve is interposed between the wand and the steam supply conduit. The valve may include a hollow body that includes: a steam inlet connection; a steam outlet connection; a condensation water drain connection; a cartridge configured to perform angular movements about a longitudinal axis; and a control knob, connected to the cartridge to impart the angular movements thereto.

6 Claims, 5 Drawing Sheets

STEAM DISPENSING APPARATUSES FOR HOT BEVERAGE PREPARATION

CROSS-REFERENCE TO RELATED APPLICATION(S)

This application claims priority under 35 U.S.C. § 119 from Italian Patent Application No. 102018000009404, filed on Oct. 12, 2018, in the Italian Patent and Trademark Office ("IPTO"), the entire contents of which are incorporated herein by reference.

The present invention relates to a steam dispensing apparatus for preparing hot beverages, having a device for prior drainage of the condensation water formed in the steam conduit, upstream from the valve, during a valve closing time elapsed from a previous steam dispensing operation.

As it is known, for example, espresso machines for bars, restaurants and similar facilities, are normally equipped with a boiler for steam generation and a steam wand for dispensing the steam so generated into a container. Conventionally, the steam dispensed by the wand is used for heating and/or frothing the milk intended for preparation of the beverage universally known as "cappuccino".

More in detail, the boiler comprises an outlet connected via a supply conduit to a dispensing valve, and in turn, to the steam wand.

Since a certain time period elapses between one steam dispensing operation and another, it will be actually found that, despite the provision of a suitable insulation, the decrease of temperature in the steam supply conduit, in the section between the outlet of the boiler and the dispensing valve, causes condensation of steam in such section of the conduit.

This causes the formation of condensation liquid which, depending on the size and length of the section of the conduit, as well as of its insulation conditions and the time elapsed from the last steam dispensing operation, can reach and exceed an amount of 10 or 12 grams.

Such condensation liquid, if not removed from the conduit in which it is formed, as steam is being dispensed for heating milk by the steam wand, eventually pours into the heated milk and, given its lower density relative to milk, remains on its surface, thereby causing an unpleasant sensation in the consumer.

In the prior art, attempts have been made to solve the issue of condensation liquid in the steam supply conduit by various arrangements.

One of these attempts consists in improving the efficiency of the thermal insulation in the section of the conduit which supplies steam to the valve.

A different known solution consists in providing a heating element in the section of the conduit where condensation may occur, which is always on between one steam dispensing operation and the other.

These are generally highly expensive and poorly efficient technical solutions.

Another prior art alternative consists in removing the condensation liquid formed upstream from the dispensing valve by simply opening the latter and keeping it open for a short period of time, before introducing the steam wand into the fluid to be heated.

Nevertheless, a drawback is noted with this method of operation, in that the condensation liquid is freely drained onto the cup holder of the machine, with the generation of splash of hot water and steam and possible soiling of the countertop.

The object of the present invention is to eliminate the condensation water generated in the section of the steam supply conduit upstream from the dispensing valve, by equipping the latter with a device that can be actuated by the dispensing valve itself, and that can channel the condensation water toward a collection and discharge conduit while causing dispensing of pure steam into the steam wand by an additional operation on the valve.

This and other objects, as better explained hereafter, are fulfilled by a steam dispensing apparatus for preparing hot beverages that has the characterizing features as set forth in the accompanying claim 1.

The invention will be now described in greater detail with reference to one embodiment thereof, given by way of illustration and without limitation, and shown in the annexed drawings, in which.

Figure 1:
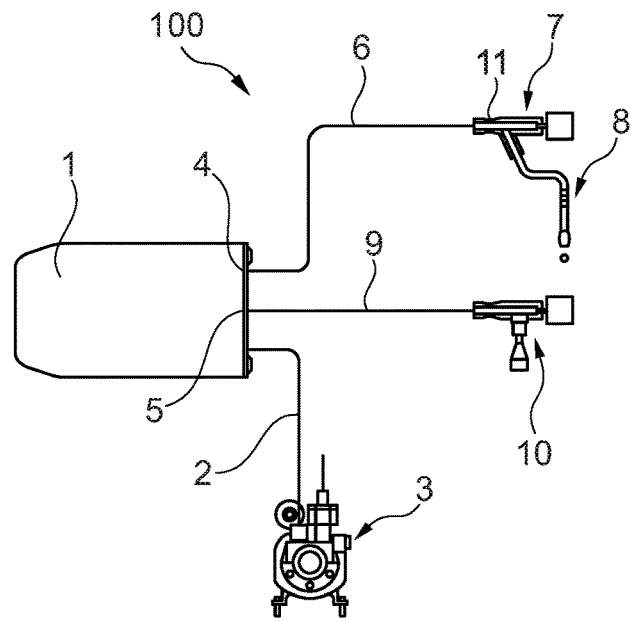
FIG. 1 shows a schematic view of certain elements of a steam dispensing apparatus for preparing hot beverages according to the present invention.

Referring to FIG. 1, the general characteristics of a steam dispensing apparatus 100 for preparing hot beverages, preferably for heating and/or frothing milk, according to the present invention are shown.

The apparatus 100 may be either provided as a stand-alone apparatus or integrated in a machine for preparing hot beverages, e.g. coffee, espresso, cappuccino, tea and the like.

The apparatus 100 comprises a boiler 1 configured to generate steam.

The apparatus 100 further comprises a water reservoir (not shown in the annexed figures) and a supply pump 3. This supply pump 3 is configured to draw water from the reservoir and to supply such water to the boiler 1 via an inlet conduit 2.

Under normal working conditions, the boiler 1 uses the water supplied into the inlet conduit 2 to generate a mixture of hot water and steam at an equilibrium temperature of about 120° C.

The boiler 1 comprises a first outlet 4. The first outlet 4 is configured to only intercept the vapor phase of the mixture.

The boiler 1 further comprises a second outlet 5 which is configured to only intercept the hot water phase of the mixture.

In addition, the apparatus 100 comprises a steam wand 8 for introducing steam into a container. Preferably, such wand 8 is designed to be immersed into the liquid, for example milk, contained in the container. By introducing steam into the milk in the container, the wand 8 can heat and/or froth such milk. Still preferably, such wand 8 has a thermally insulated operating handle 22. This operating handle 22 facilitates the control of the wand 8 for dispensing steam.

The apparatus 100 further comprises a steam supply conduit 6 connected to the first outlet 4 of the boiler 1 and configured to deliver the steam to the wand 8.

The apparatus 100 also comprises a hot water supply conduit 9 connected to the second outlet 5 and a hot water dispenser 10. The hot water supply conduit 9 is configured to supply hot water to the hot water dispenser 10.

The apparatus 100 comprises a valve 7 for dispensing steam to the wand 8 and for prior drainage of the condensation water formed in the steam supply conduit 6, upstream of the valve 7, during a closing time of the valve 7 elapsed from a previous dispensing operation. This valve 7 is interposed between the wand 8 and the steam supply conduit 6. In other words, this valve 7 connects the steam supply conduit 6 to the wand 8.

Figure 2:
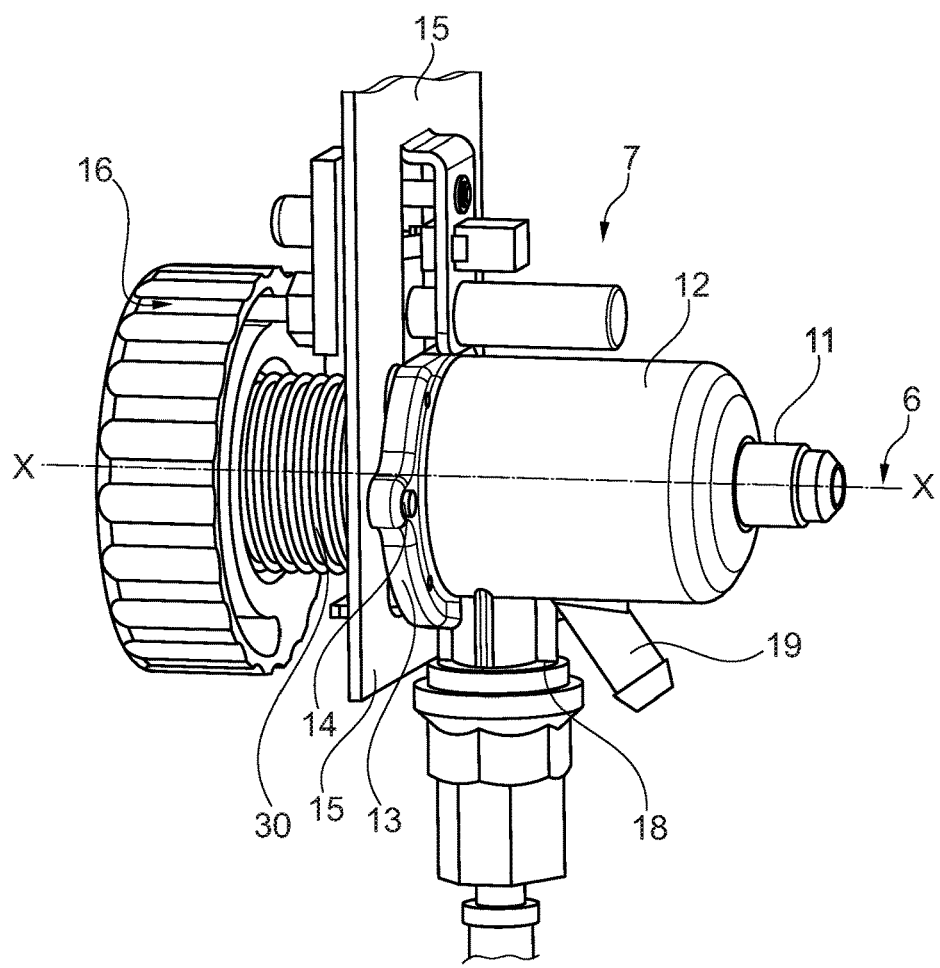
FIG. 2 shows a perspective view of the valve as viewed from the steam inlet side for the steam that comes from the boiler of the apparatus.

Particularly referring to FIG. 2, the valve 7 comprises a predominantly longitudinal hollow body 12, extending along a longitudinal axis X-X. Preferably, the hollow body 12 has a cylindrical shape.

This hollow body 12 is adapted to be overhangingly connected, via a flange 13 and screws 14, to a plate 15 that forms part of a support frame of the apparatus 100 or a frame of a hot beverage preparation machine in which the apparatus 100 is integrated. The hollow body 12 comprises an inlet connection 11 at an axial end of the hollow body 12. Such inlet connection 11 is connected to the steam supply conduit 6 so that said inlet connection 11 is in fluid communication with the steam supply conduit 6.

The hollow body 12 comprises a steam outlet connection 18 connected to the wand 8 so that the outlet connection 18 is in fluid communication with the wand 8. Preferably, the outlet connection 18 is connected to the wand 8 via a joint 20.

The hollow body 12 further comprises a condensation water drain connection 19. This drain connection 19 is adapted to be connected in fluid communication to a drain channel (not shown in the figures) that leads to the general liquid drain of the apparatus 100 or of a hot beverage preparation machine in which the apparatus 100 is integrated.

The valve 7 additionally comprises a cartridge 17, preferably having a cylindrical shape, which is axially accommodated in the hollow body 12 and is adapted to perform angular movements in either direction about the longitudinal axis X-X.

In addition, the valve 7 comprises a control knob 16 axially connected to the cartridge 17, for imparting angular movements thereto about the longitudinal axis X-X.

The cylindrical cartridge 17 has conduits for establishing hydraulic communication between the inlet connection 11 and the drain connection 19, by a first angular movement of the cartridge 17, and to establish hydraulic communication between the inlet connection 11 and the outlet connection 18 in communication with the wand 8, in response to a second angular movement of the cartridge 17, in a direction opposite to the first angular movement.

Figure 6:
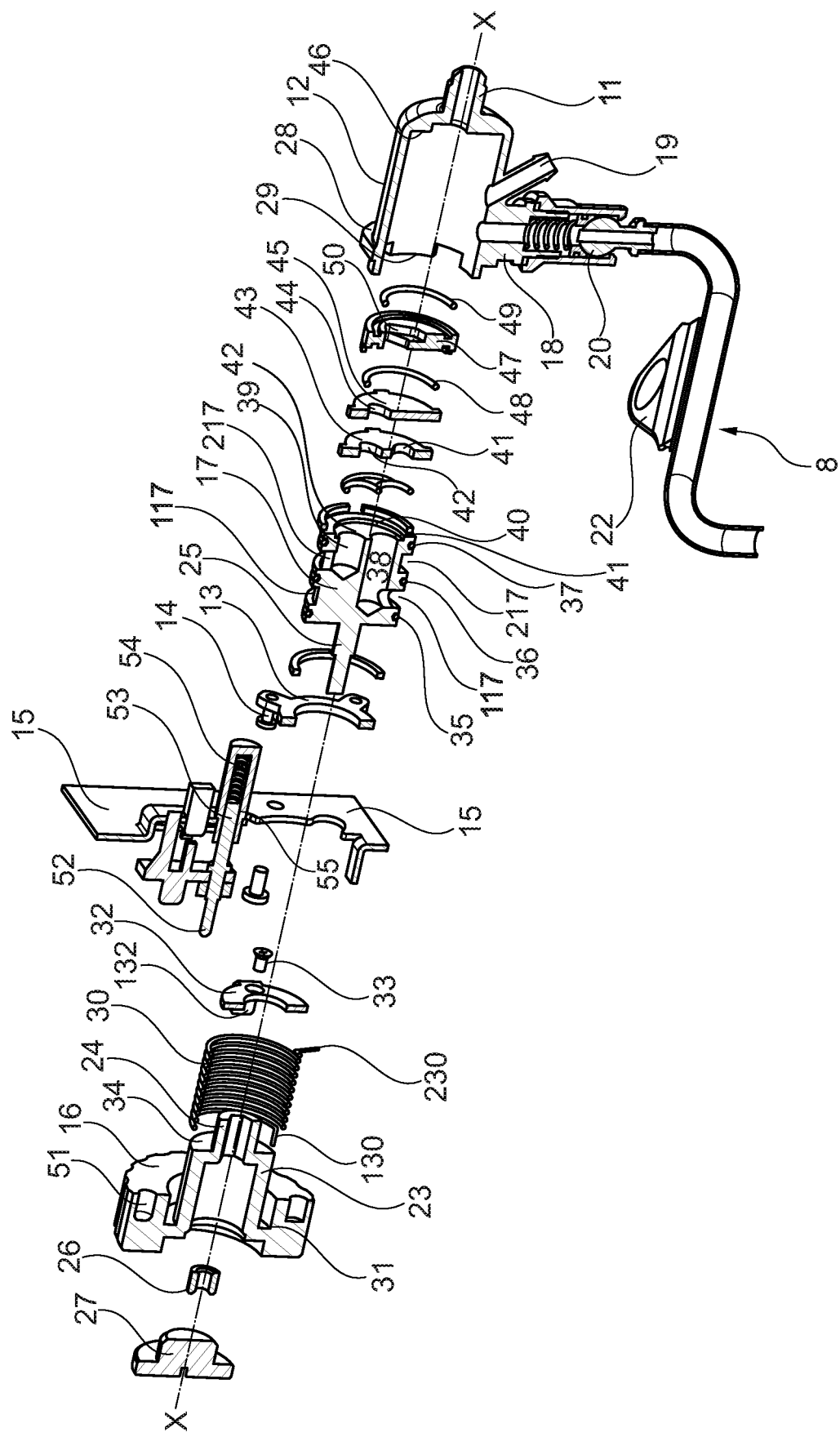
FIG. 6 shows an exploded perspective cross sectional view of the components of the valve of the apparatus according to the invention.

Particularly referring to the exploded perspective view of FIG. 6, it may be appreciated that the cartridge 17 consists of a cylindrical body.

According to a preferred embodiment of the invention, the conduits of the cartridge 17 comprise a first annular groove 117 adjacent to a second annular groove 217. The hydraulic seal of the first 117 and the second 217 annular grooves, against the inner wall of the hollow body 12, is ensured by annular seals 35, 36 and 37.

In addition, the conduits of the cartridge 17 comprise a first axial passageway 38 in hydraulic communication with the first annular groove 117.

The conduits of the cartridge 17 also comprise a second axial passageway 39 in hydraulic communication with the second annular groove 217. It shall be noted that the first 38 and the second 39 axial passageways are not in communication with each other.

The conduits of the cartridge 17 comprise first 41 and second 42 openings for the first 38 and second 39 axial passageways respectively. The first 41 and second 42 openings are formed in diametrically opposite positions on the axial end of the cartridge 17. Preferably, the first 41 and second 42 openings are formed on a transverse wall 40 of the cartridge 17. The first 41 and second 42 openings are also formed on a first disk 43. This first disk 43 is applied and rigidly joined to the same transverse wall 40 of the cartridge 17, via a conventional peripheral coupling, e.g. by means of radial tabs of the first disk 43, engaged in respective recesses of the transverse wall 40 of the cartridge 17.

The knob 16 is configured to put the second axial passageway 39 and the second opening 42 at the inlet connection 11 and to establish hydraulic communication between the inlet connection 11 and the drain connection 19 to drain the condensation water, following the first angular movement of the cartridge 17. The knob 16 is also configured to put the first axial passageway 38 and the first opening 41 at the inlet connection 11 and establish hydraulic communication between the inlet connection 11 and the outlet connection 18 in communication with the wand 8 for dispensing steam, following the second angular movement of the cartridge 17.

According to the preferred embodiment of the invention, the valve 7 comprises a stationary disk 45 which is designed to remain firmly fixed in the hollow body 12, against a bottom wall 46 of the hollow body 12, via an intermediate disk 47 with the interposition of conventional annular seals such as those referenced 48 and 49, in FIG. 6.

This intermediate disk 47 comprises a third opening 50. This third opening 50 is in communication, on one side, with the inlet connection 11 of the hollow body 12 and, on the opposite side, with a fourth opening 44 carried by the stationary disk 45. Therefore, the third opening 50 is in communication with the steam supply conduit 6. The fourth opening 44 is aligned with the third opening 50 and is thus in fluid communication with the steam supply conduit 6.

Figure 3:
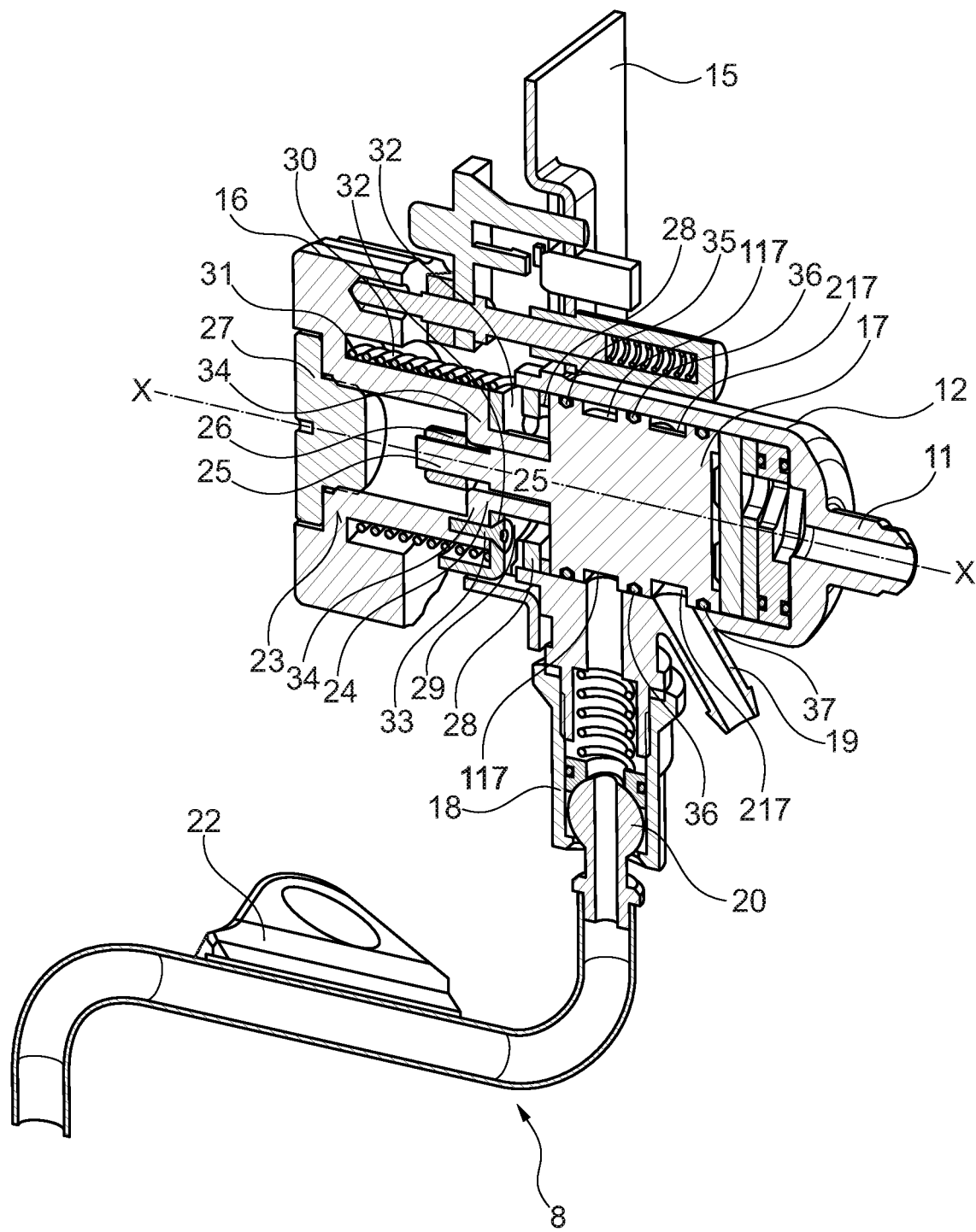
FIG. 3 shows a perspective cross sectional view of the steam dispensing valve, with the condensation water drain device in its closed position.

The fourth opening 44 is angularly displaced on the stationary disk 45 by an angle of 90° relative to the diametrical line on which the first 41 and second 42 openings of the first 38 and second 39 axial passageways, respectively, of the cartridge 17 are formed. During the operation of the valve 7, the first 41 and second 42 openings move angularly together with the cartridge 17, in either direction by means of the knob 16 and may be aligned or not alternately with the fourth opening 44 formed on the stationary disk 45. As a result of the above, when the cartridge 17 is held in the angular position in which the first 38 and second 39 axial passageways, and hence the first 41 and second 42 openings are angularly offset by 90° relative to the fourth opening 44 of the stationary disk 45, the fluid from the inlet connection 11 of the hollow body 12 does not reach either the first 41 or the second opening 42, and does not even reach either the first annular groove 117 or the second annular groove 217 of the cartridge 17. The cartridge 17 and hence the valve 7 are in the closed position as shown in FIG. 3 of the annexed drawings.

Figure 4:
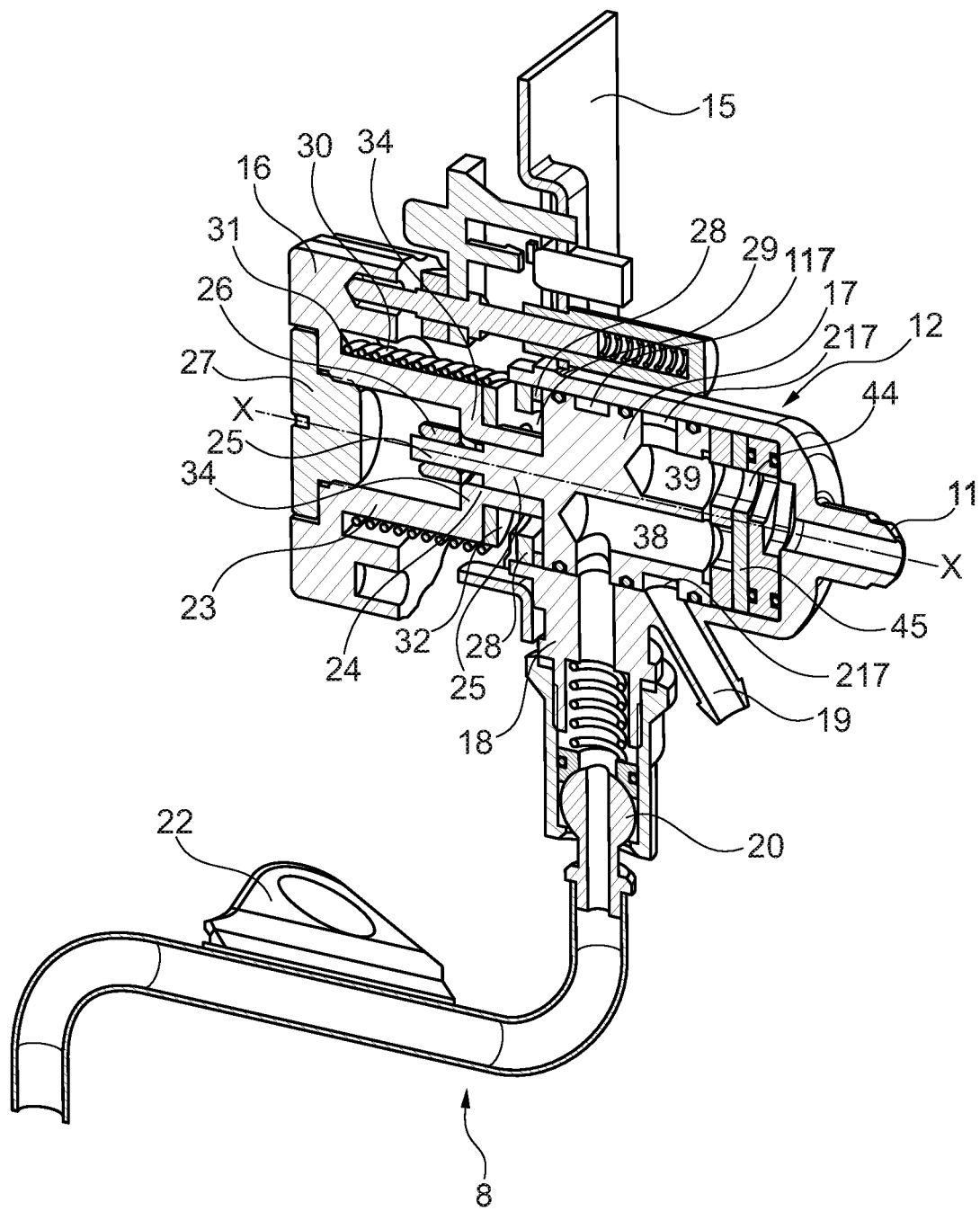
FIG. 4 shows a perspective cross sectional view of the steam dispensing valve, with the condensation water drain device in the condensation water drain position.

From such closed position, if the first angular movement is imparted to the cartridge 17, by means of the knob 16 of the valve 7, to put the second axial passageway 39 and its respective second opening 42 at the fourth opening 44 of the stationary disk 45, as shown in FIG. 4, hydraulic communication is established between the inlet connection 11 and the second annular groove 217 of the cartridge 17 and from the latter to the drain connection 19 which, as mentioned above, is in communication with a condensation water drain channel.

Figure 5:
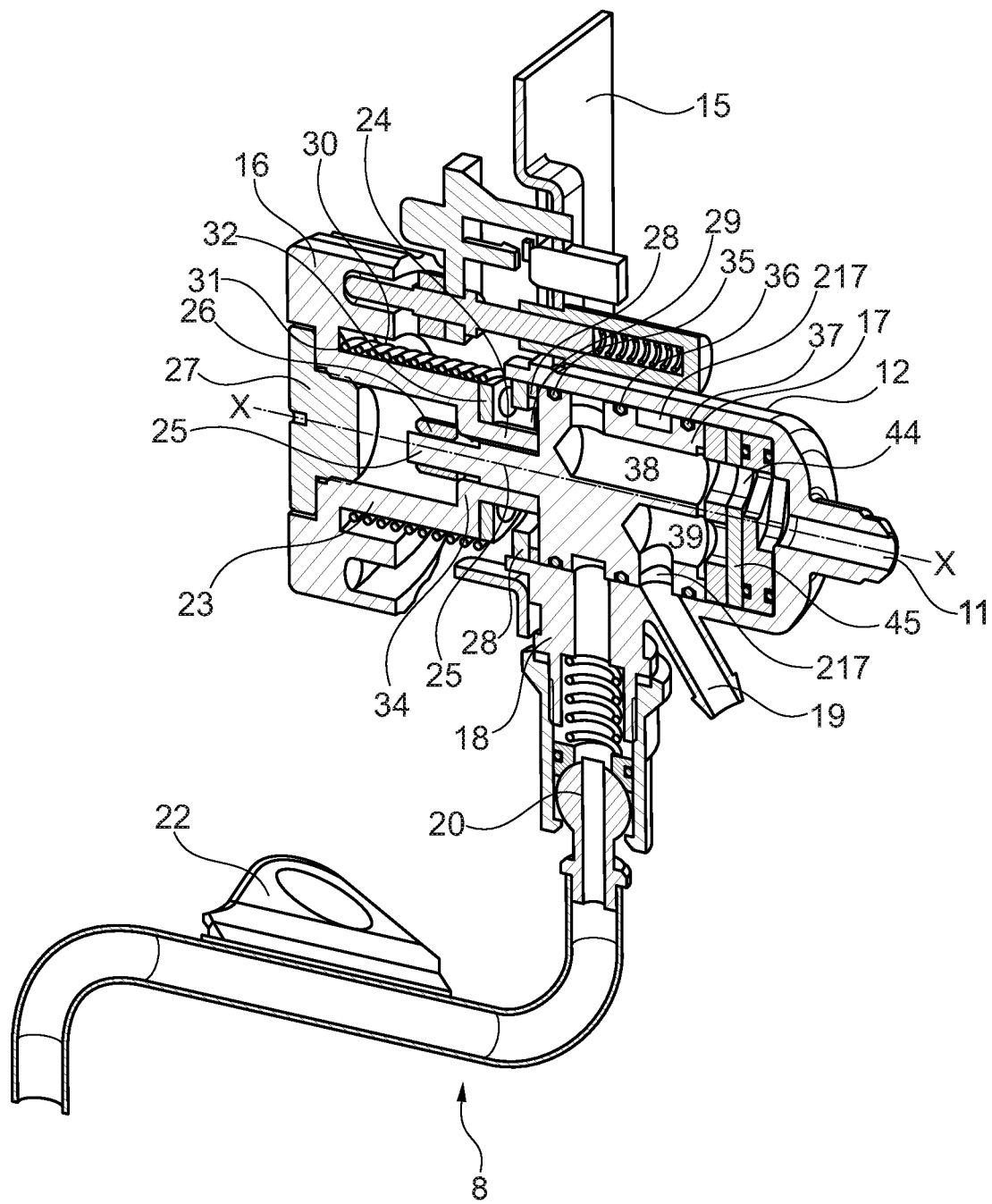
FIG. 5 shows a perspective cross sectional view of the steam dispensing valve, with the condensation water drain device in the steam dispensing position.

On the other hand, if the second angular movement is imparted to the cartridge 17 by means of the knob 16 to put the first axial passageway 38 and its respective first opening 41 at the fourth opening 44 of the stationary disk 45, as shown in FIG. 5, then hydraulic communication is established between the inlet connection 11 and the first annular groove 117 of the cartridge 17 and from the latter to the outlet connection 18 which, as mentioned above, is in communication with the wand 8 for dispensing steam.

A shank 25 that axially projects out of the cartridge 17 is fitted into an end section 24 of the tubular element 23 and is rigidly joined to the end section 24 by conventional fastening means 26.

A cap 27, which is threadedly mounted to the front on the knob 16, closes the cavity of the tubular element 23 and prevents access to the fastening means 26.

The shank 25 of the cartridge 17 engages with the end section 24 of the tubular element 23, by axially extending through a transverse wall 28 of an axial end of the hollow body 12, into an end opening 29 of the hollow body 12, in which said end section 24 of the tubular element 23 is also coaxially received.

Still according to the preferred embodiment of the invention, the valve 7 comprises an automatic springback member 30 for moving the knob 16 back to the position in which it closes both the outlet connection 18 and the drain connection 19, as a result of the angular displacement of the cartridge 17 which establishes hydraulic communication between the inlet connection 11 in the hollow body 12 and the drain connection 19 of the hollow body 12.

Preferably, automatic springback member 30 comprises a helical spring coaxially arranged on the tubular element 23 between an annular shoulder 31 of the knob 16 and a second disk 32, fixed with additional screws 33, against one end 34 of the tubular element 23.

In the preferred embodiment of the invention, as shown in detail in FIG. 6, the springback member 30 consists of a cylindrically coiled metal wire with a first end 130 in a special axial housing of the knob 16 and a second end 230, opposite to the first end 130 along the longitudinal axis X-X, resting against a tab 132 of the second disk 32.

With this arrangement of the springback member 30, it will be understood that, as a result of the angular movement of the knob 16 which establishes hydraulic communication between the inlet connection 11 and the drain connection 19, the springback member 30 is torsionally loaded and, upon release of the knob 16, the springback member 30 causes the automatic return of the same knob 16, thereby discharging the torsion energy stored therein.

According to the preferred embodiment of the invention, the valve 7 comprises a device for identifying the operating positions of the knob 16.

This device for identifying the operating positions of the knob 16 comprises a plurality of recesses formed at the periphery of an annular groove 51, for engagement of the tip 52 of a piston 53, which is biased by a spring 54 and slides in a cylindrical housing 55, mounted to the plate 15.

In short, with the valve 7, a first angular movement on the knob 16, for example in a counterclockwise direction, can cause drainage of the condensation liquid accumulated in the steam supply conduit 6, and channel it to the drain connection 19.

Then, once the knob 16 has been automatically moved back to the rest position by the springback member 30, a second angular movement in a direction opposite to the first movement, can cause steam to be dispensed, by channeling it to the wand 8, free of any condensation liquid.

The invention claimed is:

1. A steam dispensing apparatus for hot beverage preparation, the apparatus comprising:
    a boiler configured to generate steam and comprising a first outlet;
    a wand configured to introduce the steam into a container;
    a steam supply conduit connected to the first outlet of the boiler and configured to supply the steam to the wand; and
    a valve for dispensing the steam to the wand and for draining condensation water formed in the steam supply conduit upstream from the valve, during a closing time of the valve elapsed from a previous dispensing operation, wherein the valve is interposed between the wand and the steam supply conduit, and wherein the valve comprises:
    a hollow body extending along a longitudinal axis, the hollow body comprising:
        a steam inlet connection, located at an axial end of the hollow body, wherein the steam inlet connection is connected to the steam supply conduit to receive the steam from the boiler;
        a steam outlet connection, connected to the wand for supplying the steam to the wand;
        a condensation water drain connection;
        a cartridge, axially accommodated in the hollow body, configured to perform angular movements in either direction about the longitudinal axis; and
        a control knob, axially connected to the cartridge to impart the angular movements thereto, the cartridge having conduits for establishing hydraulic communication between the steam inlet connection and the condensation water drain connection, by a first angular movement of the cartridge, and for establishing hydraulic communication between the steam inlet connection and the steam outlet connection in communication with the wand, in response to a second angular movement of the cartridge, in a direction opposite to the first angular movement.

2. The apparatus of claim 1, wherein the conduits of the cartridge comprise:
    a first annular groove adjacent to a second annular groove;
    a first axial passageway in hydraulic communication with the first annular groove;
    a second axial passageway in hydraulic communication with the second annular groove; and
    first and second openings for the first and second axial passageways, respectively, wherein the first and second openings are formed in diametrically opposite positions on an axial end of the cartridge;
    wherein the control knob is configured to put the second axial passageway and the second opening at the steam inlet connection and to establish the hydraulic communication between the steam inlet connection and the condensation water drain connection to drain condensation water, following the first angular movement of the cartridge, and is configured to put the first axial passageway and the first opening at the steam inlet connection and to establish the hydraulic communication between the steam inlet connection and the steam outlet connection in communication with the wand to dispense the steam, following the second angular movement of the cartridge.

3. The apparatus of claim 2, wherein the valve comprises a stationary disk, which remains firmly fixed in the hollow body, against a bottom wall of the hollow body, via an intermediate disk, wherein the intermediate disk comprises a third opening, wherein the third opening is in communication, on one side, with the steam inlet connection of the hollow body and, on an opposite side, with a fourth opening carried by the stationary disk, and wherein the fourth opening is angularly displaced on the stationary disk by an angle of 90° relative to a diametrical line on which the first and second openings of the first and second axial passageways, respectively, of the cartridge are formed.

4. The apparatus of claim 1, wherein the valve comprises an automatic springback member for moving the control knob back to a position in which the control knob closes both the steam outlet connection and the condensation water drain connection, as a result of the first angular movement of the cartridge which establishes the hydraulic communication between the steam inlet connection of the hollow body and the condensation water drain connection of the hollow body.

5. The apparatus of claim 1, wherein the valve comprises a device for identifying operating positions of the control knob.

6. The apparatus of claim 5, wherein the device for identifying the operating positions of the control knob comprises a plurality of recesses formed at a periphery of an annular groove, for sliding engagement of a tip of a piston, which is biased by a spring and slides in a cylindrical housing, mounted on a plate that is part of a support frame.

* * * * *